United States Patent
Cording et al.

(10) Patent No.: US 9,488,397 B2
(45) Date of Patent: Nov. 8, 2016

(54) METHOD OF CHARGING A COOLANT

(71) Applicant: Agramkow Fluid Systems A/S, Sonderborg (DK)

(72) Inventors: Louis Cording, Sonderborg (DK); Claes Mansson, Sondeborg (DK)

(73) Assignee: Agramkow Fluid Systems A/S, Sonderborg (DK)

( * ) Notice: Subject to any disclaimer, the term of this patent is extended or adjusted under 35 U.S.C. 154(b) by 251 days.

(21) Appl. No.: 14/171,841

(22) Filed: Feb. 4, 2014

(65) Prior Publication Data
US 2014/0216073 A1    Aug. 7, 2014

(30) Foreign Application Priority Data

Feb. 4, 2013   (DK) ................................. 2013 00065
Mar. 18, 2013  (DK) ................................. 2013 00156

(51) Int. Cl.
*F25B 45/00*    (2006.01)
*G01F 1/88*     (2006.01)

(52) U.S. Cl.
CPC ................. *F25B 45/00* (2013.01); *G01F 1/88* (2013.01); *F25B 2345/001* (2013.01); *F25B 2345/003* (2013.01); *F25B 2345/006* (2013.01)

(58) Field of Classification Search
CPC .............. F25B 45/00; F25B 2345/001; F25B 2345/003; F25B 2345/006; G01F 1/86; G01F 1/88
See application file for complete search history.

(56) References Cited

U.S. PATENT DOCUMENTS

| | | | |
|---|---|---|---|
| 4,470,265 A | | 9/1984 | Correira |
| 5,231,841 A | * | 8/1993 | McClelland ............ F25B 45/00 62/125 |
| 5,758,506 A | * | 6/1998 | Hancock ............ B60H 1/00585 62/149 |
| 5,802,859 A | | 9/1998 | Zugibe |
| 2006/0010898 A1 | * | 1/2006 | Suharno ............ B60H 1/00585 62/292 |
| 2009/0126379 A1 | * | 5/2009 | Yamaguchi ............ F25B 13/00 62/149 |
| 2010/0223940 A1 | * | 9/2010 | Kotani .................... F25B 45/00 62/149 |

FOREIGN PATENT DOCUMENTS

CN      201363976 Y    12/2009
WO    WO2011/049767 A2    4/2011

OTHER PUBLICATIONS

European Search Report for corresponding EP application No. 14 38 8001, mailed Apr. 3, 2014, 5 pages.
English Abstract, CN000201363976Y, 2 pages.

* cited by examiner

*Primary Examiner* — Ryan J Walters
*Assistant Examiner* — Christopher R Zerphey
(74) *Attorney, Agent, or Firm* — Ware, Fressola, Maguire & Barber LLP

(57) ABSTRACT

To ensure precise charging of a coolant into a cooling system (6) via a hose (4), temperature sensors (Ts and Te) and pressure sensors (Ps and Pe) are mounted at the inlet side and/or outlet side of the hose (4). A signal may be applied from these sensors to a computer (11), which is capable of calculating the amount pumped through the hose (4) and thereby controlling it via a valve (5). It is ensured in this manner that the charged amount is determined on the basis of its density and not, as was previously the case, solely on the basis of a weight control.

8 Claims, 1 Drawing Sheet

METHOD OF CHARGING A COOLANT

CROSS REFERENCE TO RELATED APPLICATIONS

This application claims priority in Danish Patent application no. PA 2013 00065, filed 4 Feb. 2013 and Danish Patent application no. PA 2013 00156, filed 18 Mar. 2013, the contents of these applications being hereby incorporated by reference.

BACKGROUND

The invention relates to a method of charging a coolant into a cooling system via a conduit, such as a hose, to which the coolant is applied at the inlet end, and which is connected with the cooling system at the outlet end, and wherein the charging is controlled by a meter on the inlet end of the hose which controls a valve at the outlet end of the hose, a device therefor and use thereof.

Such a method takes place in connection with service and repair of cooling systems.

When a gaseous coolant is used, special physical conditions are involved, and thereby conditions which have to be taken into consideration when a given amount of gaseous coolant has to be charged.

Known methods concern charging by weight, which means that the charged amount is weighed during the charging.

Examples of such a charging are known from JP 8 303 960 A and U.S. Pat. No. 4,470,265 A, both of which describe charging by weight of the coolant.

Charging based on the measurement of the mass flow of the coolant is known U.S. Pat. No. 5,231,841 A. A constant volumetric flow is maintained by means of a flow valve. By measuring the pressure and the temperature the density may be determined after the valve, following which the mass flow may be calculated.

A similar method is known U.S. Pat. No. 5,758,506 A. Here, too, the mass flow is measured. By using a fixed resistance in the form of a nozzle and by measuring the pressure difference across the nozzle and measuring temperature and pressure before and after the nozzle, the flow through the nozzle—and thereby the charging—may be calculated.

These charging methods, however, suffer from a considerable inaccuracy, which is caused by the fact that the charging takes place via a hose whose interior volume depends on its length, which may be up to 7 meters, as well as its internal diameter, just as the supply pressure of the coolant, its temperature and the temperature of the surroundings have an effect on the density of the coolant. This is measured in weight per unit of volume.

Thus, the measured and calculated amount of coolant is just a measure of the amount which passes through the meter. However, this amount is not the amount which passes the charging valve at the outlet side of the hose because of the length of the hose between the measurements and the valve. This means inaccuracy of the charged amount of coolant.

To this should be added that the pressure may drop through the hose, as it will normally be higher at the inlet end than at the outlet end, and, thereby, that its density is higher at the inlet end than at the outlet end during the charging.

This means that the average density of the coolant in the hose will be smaller, and, thereby, that the amount in the hose will have dropped relative to an amount at the inlet side in the hose. Thus, the hose has been emptied to a certain degree from start to end of the charging, which amount will have been added to the cooling system without the meter having recorded it.

This difference in density will moreover be dependent on the length of the hose and its internal diameter, which, however, are variables which may be included in the necessary calculation of the compensation.

These factors contribute to making it difficult to charge the correct and precise amount of coolant into a cooling system.

SUMMARY OF THE INVENTION

It is the object of the invention to remedy this defect of the known methods of charging coolant into a cooling system.

This is achieved by a method according to the invention, in which the temperature of the coolant as well as its pressure is recorded currently at its admission to the hose and/or at its discharge from the hose. This ensures the highest possible accuracy in a simple manner, and thereby certainty that precisely the desired amount of coolant is charged irrespective of the physical state of the coolant.

When sensors are used for both temperature and pressure at the inlet end as well as the outlet end of the hose, a connected computer with suitable software will be able to compensate and control the charging via a flow valve.

Finally, it is expedient to use the method for the control and regulation of the charging of a gaseous coolant, since there will be a relatively great difference in density through the hose owing to the flow and the pressure drop created thereby.

BRIEF DESCRIPTION OF THE DRAWINGS

An example of an embodiment of the method and a device therefor will be described more fully below with reference to the drawing, in which.

DESCRIPTION OF AN EXEMPLARY EMBODIMENT

Figure 1:
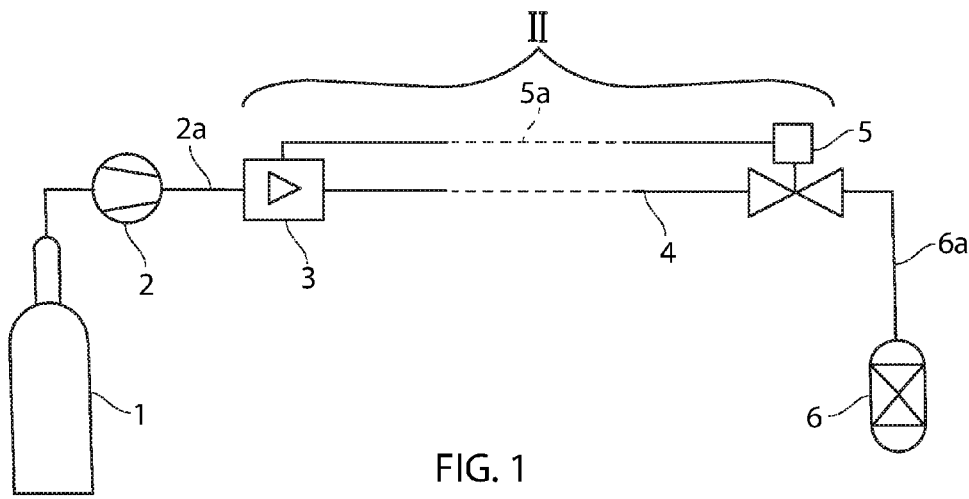
FIG. 1 shows a basic sketch of the known charging method.

FIG. 1 shows an example of a known method of charging, illustrated by a system drawing which shows the coolant in a pressure cylinder 1 connected with a pump 2, which urges the coolant via a conduit 2a through a quantity meter 3 to a hose 4, which may have a length of several meters.

The outlet end of the hose 4 has mounted therein a flow valve 5, which, via a signal 5a from the meter 3, controls the supply of gas via a conduit 6a to the cooling system 6 into which the coolant is to be charged.

This method is not very accurate, since the charging amount is solely based on a meter 3, and where no consideration is paid to the density of the coolant, which will be dependent on the temperature of the coolant itself, the temperature around the system, its pressure and the volume of the hose.

Figure 2:
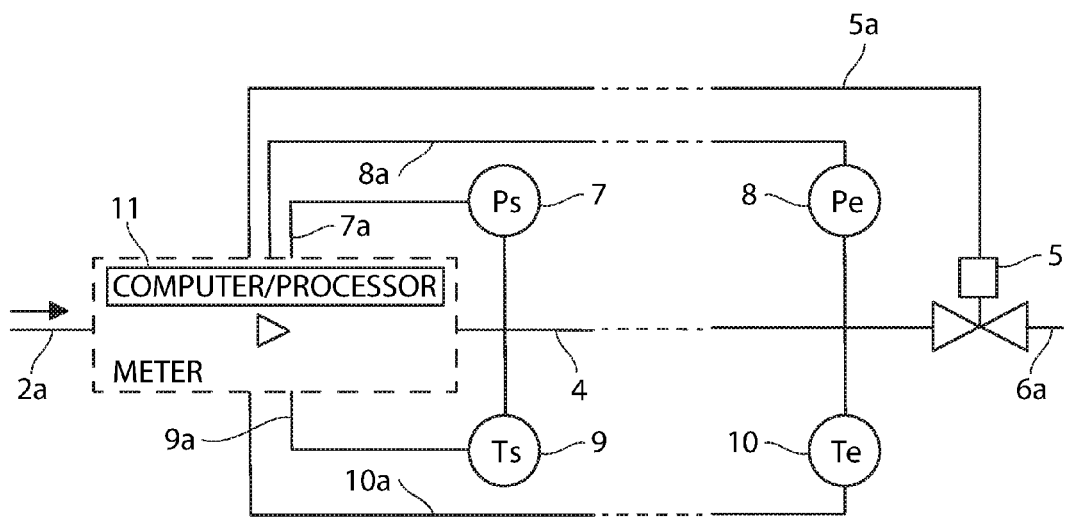
FIG. 2 shows the method according to the invention.

FIG. 2 shows an example of a system according to the invention, comprising a hose 4, to which the coolant is fed under pump pressure via the conduit 2a, and with a flow valve 5 for the control of the coolant via a conduit 6a to a cooling system (not shown).

To ensure accurate charging, sensors are mounted according to the invention. These sensors of temperature T and pressure P, respectively, are mounted at the inlet end as well as the outlet end of the hose 4. These sensors are indicated by Ts and Ps for the inlet sensors and Te and Pe for the outlet sensors, respectively.

The sensors send a signal to a computer 11 via signal generators 7a and 9a for the inlet part and 8a and 10a for the outlet part of the hose.

This allows software in the computer 11 to calculate the density of the gas flow through the hose 4 and thereby to compensate the amount passing through the valve 5, and thereby to ensure that the precise amount of coolant is charged irrespective of its physical state, and no matter whether the coolant is in gas form or liquid form.

When a predetermined amount has passed through the valve 5, a signal 5a is applied to the valve 5, which can thereby block the flow and thus the charging into the cooling system.

Hereby, the charging is more precise, since the accurate amount of coolant and thereby the most economical maintenance and operation of a cooling system of this type are ensured.

In practice, the signal generators will be gathered around the hose 4, which will thereby be a carrier of these, at the same time as the coolant is conveyed via the interior of the hose. Coupling means between the charging part and the cooling system will be mounted in a generally known manner at the outlet end of the hose, where the valve 5 is mounted.

The invention claimed is:

1. A method of charging a coolant into a cooling system through a length of conduit comprising:
   connecting an outlet end of the length of conduit to the cooling system;
   supplying coolant to an inlet end of the length of conduit, the length of conduit extending without interruption from the inlet end of the length of conduit to the outlet end of the length of conduit;
   providing a meter on the inlet end of the length of conduit which controls a valve located at the outlet end of the length of conduit;
   charging the coolant through the length of conduit to the cooling system, the meter controlling an amount of coolant delivered to the cooling system by controlling the valve at the outlet end of the length of conduit;
   monitoring a density of the coolant during the charging by:
   recording a temperature of the coolant and a pressure of the coolant in the length of conduit to determine a precise charging amount the coolant supplied to the cooling system, wherein the temperature and pressure of the coolant are recorded at the inlet end of the length of conduit and at the outlet end of the conduit, the length of conduit having a known interior volume and the density determined at both the inlet end of the conduit and the outlet end of the conduit so as to determine a density difference indicative of an amount of coolant emptied from the length of conduit into the cooling system due to the length of conduit and a pressure drop between the inlet to the length of conduit and the outlet to the length of conduit.

2. The method according to claim 1 further comprising using the temperatures and pressures for determining and monitoring a density of the coolant supplied during the charging of the cooling system, and delivering a precise amount of coolant to the cooling system based on the coolant density.

3. The method of claim 2 further comprising providing a computer which receives the temperatures and pressures at the inlet end of the conduit and the outlet end of the length of conduit and calculates a density of the coolant in the length of conduit, the computer generating a signal for controlling the valve to deliver a precise amount of coolant to the cooling system based on coolant density.

4. A device for recording and controlling an amount of coolant charged into a cooling system through a length of conduit comprising:
   a conduit having an outlet end connectable to the cooling system, and an inlet end connectable to a supply of a coolant, the length of conduit extending without interruption from the inlet end of the conduit to the outlet end of the conduit;
   a meter provided on the inlet end of the conduit, and a valve located at the outlet end of the conduit, the meter controlling the valve to control the amount of coolant supplied to the cooling system;
   an inlet temperature sensor and an inlet pressure sensor located at the inlet end of the conduit for sensing a pressure and a temperature of the coolant at the inlet end of the conduit;
   an outlet temperature sensor and an outlet pressure sensor located at the outlet end of the conduit for sensing a pressure and a temperature of the coolant at the outlet end of the conduit; and,
   a processor configured to receive and record the temperatures and the pressures of the coolant in a known interior volume of the length of conduit and use the temperatures and pressures for determining and monitoring a density of the coolant supplied during the charging of the cooling system, and delivering a precise amount of coolant to the cooling system based on the coolant density.

5. The device according to claim 4, wherein the processor is a computer which receives signals from the temperature sensors and the pressure sensors, the computer generating a signal for controlling the valve.

6. The device of claim 4 wherein the conduit has variable length and holds a variable volume of coolant therein, which also varies dependent on the temperature and the pressure of the coolant in the conduit.

7. A method to compensate and control of charging a coolant into a cooling system via a conduit to which the coolant is applied at an inlet end of the conduit, and which is connected with the cooling system at an outlet end of the conduit, the conduit extending without interruption from the inlet end of the conduit to the outlet end of the conduit, and wherein the charging is controlled by a meter on the inlet end of the conduit which controls a valve at the outlet end of the conduit, and wherein density of the coolant during the charging is monitored currently, comprising current recordal of temperature of the coolant as well as pressure in the conduit to achieve a precise charging of the cooling system, where both the temperature of the coolant and the pressure are currently recorded both at the inlet end of the conduit and at the outlet end of the conduit, wherein both the temperature and the pressure are measured by sensors located at the inlet end of the conduit and the outlet end of the conduit, and wherein the control and the compensation of an amount of coolant takes place in a computer, to which signals from the temperature sensors and the pressure sensors are applied, where the computer calculates the density of the coolant flowing through a known volume of the conduit and compensates the amount of coolant passing through the valve, and that a signal for the control of the valve is applied from the computer.

8. The method according to claim 7, wherein the conduit is of a variable length and therefore volume, and the compensation and control is carried out in consideration of the length and therefore volume of the conduit.

* * * * *